United States Patent [19]

Dischert et al.

[11] 4,323,916
[45] Apr. 6, 1982

[54] DATA RATE REDUCTION FOR DIGITAL VIDEO SIGNALS BY SUBSAMPLING AND ADAPTIVE RECONSTRUCTION

[75] Inventors: Robert A. Dischert, Burlington; Glenn A. Reitmeier, Trenton, both of N.J.

[73] Assignee: RCA Corporation, New York, N.Y.

[21] Appl. No.: 168,077

[22] Filed: Jul. 14, 1980

Related U.S. Application Data

[63] Continuation of Ser. No. 132,137, Mar. 20, 1980, abandoned.

[30] Foreign Application Priority Data

Feb. 7, 1980 [GB] United Kingdom ............... 04195/80

[51] Int. Cl.³ .............................................. H04N 9/32
[52] U.S. Cl. ..................................... 358/13; 358/133; 358/138
[58] Field of Search ................... 358/12, 13, 133, 138; 375/31, 33

[56] References Cited

U.S. PATENT DOCUMENTS

| | | | |
|---|---|---|---|
| 3,462,547 | 8/1969 | Macovski | 358/133 |
| 4,204,227 | 5/1980 | Gurley | 358/13 |
| 4,227,204 | 10/1980 | Rossi | 358/13 |

FOREIGN PATENT DOCUMENTS

| | | |
|---|---|---|
| 1204180 | 9/1970 | United Kingdom . |
| 1373940 | 11/1974 | United Kingdom . |
| 1471420 | 4/1977 | United Kingdom . |
| 1507628 | 4/1978 | United Kingdom . |
| 1516168 | 6/1978 | United Kingdom . |

*Primary Examiner*—Richard Murray
*Attorney, Agent, or Firm*—Paul J. Rasmussen; William H. Meise; Henry I. Steckler

[57] ABSTRACT

A digital TV system reduces the data rate by transmitting or recording only bytes representing half of the sampled pixels. Steering bits are also transmitted that tell which of the transmitted bytes are the closest match to the untransmitted bytes so the pixels represented by the later can be reconstructed.

29 Claims, 10 Drawing Figures

ENCODER

ORIGINAL SAMPLING OF THE PICTURE

SUBSAMPLED VERSION OF THE PICTURE

ENCODER

DATA RATE REDUCTION FOR DIGITAL VIDEO SIGNALS BY SUBSAMPLING AND ADAPTIVE RECONSTRUCTION

CROSS-REFERENCE TO RELATED APPLICATION

This is a continuation of application Ser. No. 132,137, filed Mar. 20, 1980, now abandoned the priority of which is hereby claimed.

BACKGROUND OF THE INVENTION

The present invention relates to digital video systems, and more particularly, to systems for reducing the required data rate without sacrificing picture quality.

In digital broadcast systems, the effective use of the data rate is of primary importance. A reduction in data rate reduces both video tape usage and the necessary transmission bandwidth; however, this must be accomplished while maintaining broadcast quality pictures.

One method of data reduction which is presently under consideration is the process of sub-Nyquist sampling, such as is disclosed in the paper "Sub-Nyquist Encoded PCM NTSC Color Television" by John P. Rossi in the book "Digital Video," a review of SMPTE papers, and in the article by Leonard S. Golding, "Frequency Interleaved Sampling of a Color Television Signal," IEEE Transactions on Communication Technology, Volume COM-19, page 972, December, 1971. These sub-Nyquist type systems have samples that lie along diagonals with the distance between the diagonals being greater than the horizontal distance between samples. Since the smaller the distance between samples the greater the resolution, these systems are capable of increasing the horizontal resolution which is available at a given data rate, but at the expense of the diagonal resolution.

It is therefore desired to have a data rate reduction arrangement for digital television signals that does not cause any sacrifice in picture quality.

SUMMARY OF THE INVENTION

In brief, the system of the invention comprises dividing a signal into first and second time portions, transmitting the first portion, and transmitting a control signal adapted to control the reconstruction of said second portion from the transmitted first portion.

DETAILED DESCRIPTION OF THE INVENTION

Figure 1:
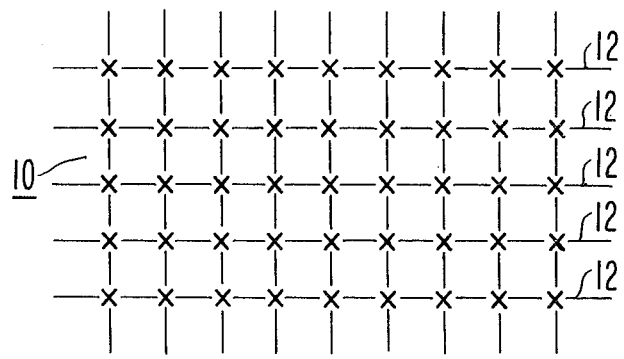
FIG. 1 illustrates a raster produced by simultaneous vertical and horizontal scanning of an election beam with sample points thereon.

FIG. 1 shows a video raster 10 comprising a plurality of horizontal scanning lines 12. Each of the letters "X" represents a sampling point, which typically is 8-bit or byte sampled for a total of 256 gray levels. These sampling points occur in a preferred embodiment at 14.32MHz, which is four times the NTSC color subcarrier frequency. This sampling rate results in horizontally adjacent samples occurring at about 70 nanosecond intervals.

Figure 2:
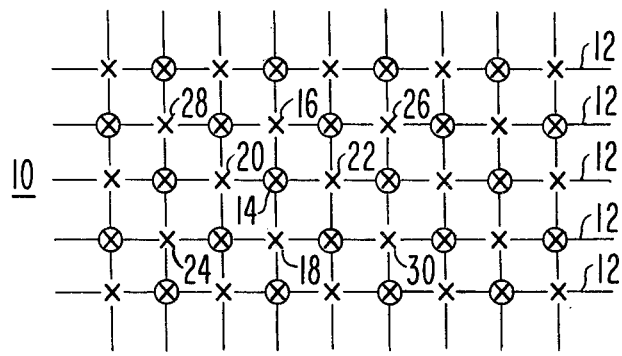
FIG. 2 illustrates a sub-sampled version of the same raster.

FIG. 2 is a similar drawing wherein corresponding elements have been given corresponding reference numerals. Here each circled "X" represents samples which will not be transmitted or recorded. For each sample that is not so transmitted or recorded, various combinations of the spatially surrounding samples are computed and compared to the sample not transmitted. For example, the sample representing point 14 is compared with the average of the sampled points above and below it, namely points 16 and 18. It is also compared to the average of points to its left and right, namely points 20 and 22. The sample representing point 14 is also compared to the average of the transmitted points 24 and 26 which are in one diagonal relationship to it, and also to the average of transmitted points 28 and 30 which are in another diagonal relationship to it. Whichever comparison provides the closest match is indicated by "steering" or control bits. These control bits are transmitted as additional bits along with the samples that represent the uncircled points in FIG. 2, and together with those samples, are used by a decoder to reconstruct a high resolution picture from reduced data rate information.

Figure 3:
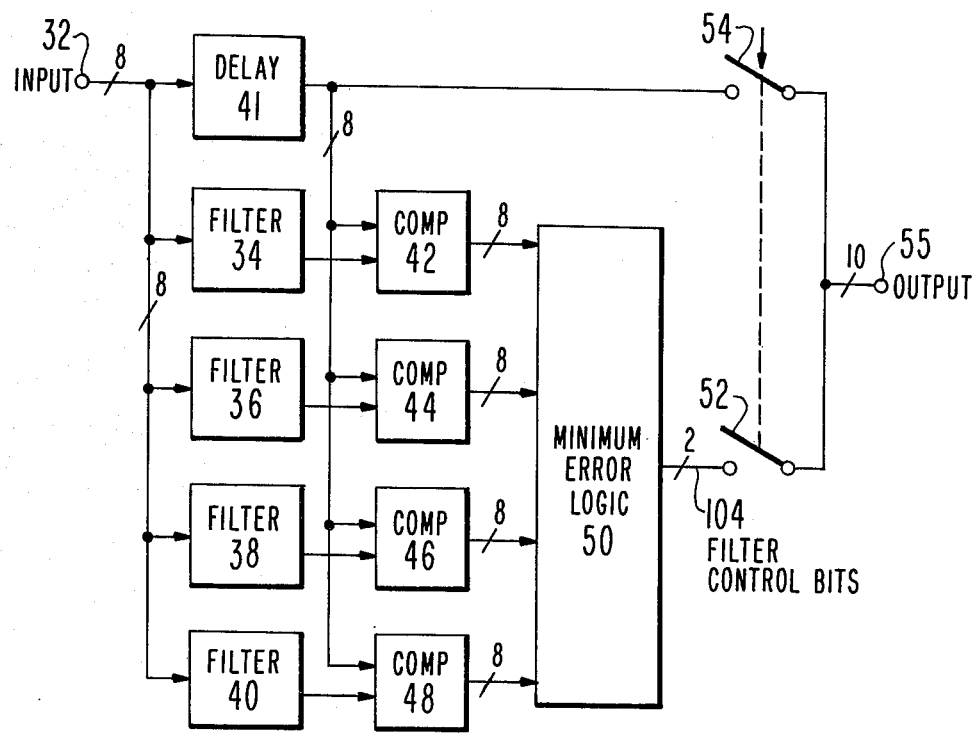
FIG. 3 illustrates a block diagram of an encoder for encoding samples of a video signal and control signals in accordance with an embodiment of the invention.
Figure 6:
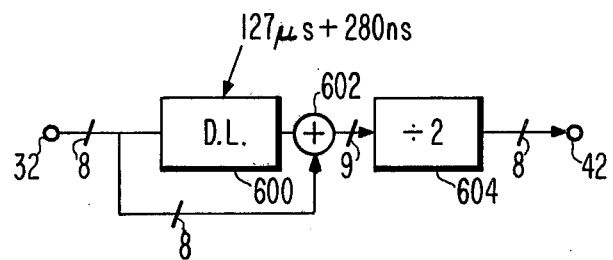
FIGS. 6, 7, 8 and 9 illustrate block diagrams of filters used in FIGS. 3 and 4.
Figure 7:
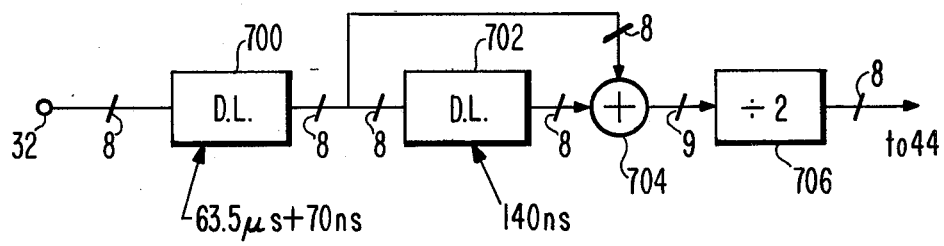
Figure 8:
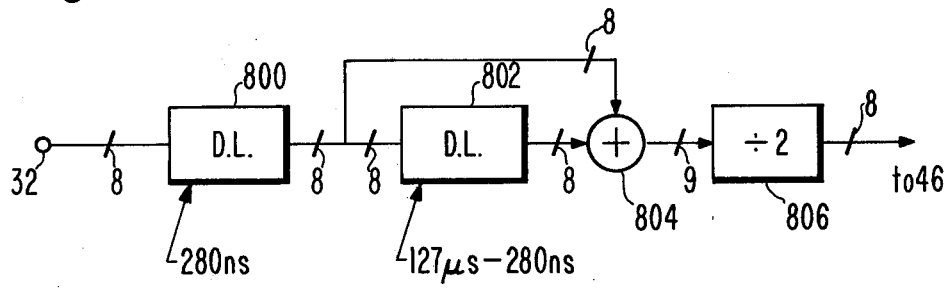
Figure 9:
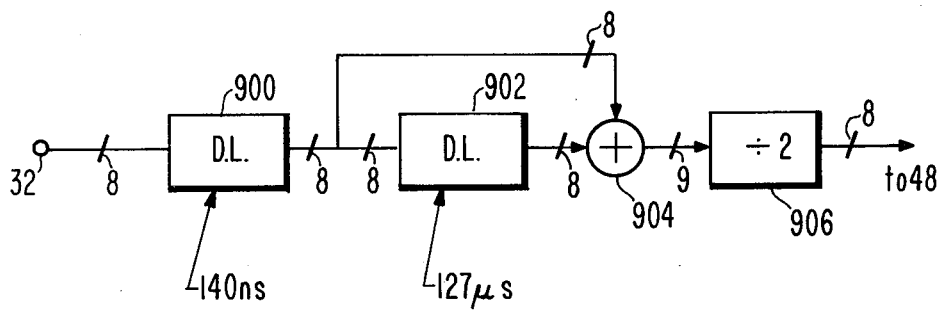

FIG. 3 illustrates an encoder for achieving the above-described transmission. An input 32 receives the digital video signal having samples occurring, in a particular embodiment, at 14.32MHz with 8 bits per sample. The 8 bits of each sample are applied to a delay line 41 and to filters 34, 36, 38 and 40. These filters are used to provide the average of the surrounding samples. By "average" is meant adding two signals together and then dividing the resulting sum by two. As can be determined by inspection of FIG. 2, sample points 28 and 30 are spaced in time by two horizontal lines and four signal sampling intervals. This corresponds to approximately 127 microseconds, in the NTSC system, plus 280 nanoseconds. FIG. 6 illustrates the details of filter 34 and comprises a digital delay line 600 having a delay of 127 microseconds plus 280 nanoseconds coupled between input terminal 32 and an input terminal of a digital adder 602. Undelayed signals from terminal 32 also are coupled to a second input terminal of adder 602. The digital sum of these signals, corresponding to the video signals at sample points 28 and 30, is obtained at the output terminal of adder 602 and coupled to an input terminal of a digital divider 604. Divider 604 divides this summed signal by two to provide at its output terminal an 8-bit parallel signal representing the average signal of sample points 28 and 30. This averaged signal is coupled to an input terminal of a comparator 42 in FIG. 3. Delay line 41 also comprises an 8-bit digital delay line and has a delay of about 63.5 microseconds plus 140 nanoseconds. This time is equal to one-half of the total delay of delay line 600 of filter 34, and delays the video at sample point 14 of FIG. 2 that is not to be transmitted so it will be in time coincidence with the averaged signal from filter 34 so the two signals can be compared by comparator 42. Filter 36 supplies the average of points 20 and 22 (a "horizontal" average). It comprises an 8-bit wide digital delay line 702 in FIG. 7 having delay of about 140 nanoseconds. The input (undelayed) and output (delayed) signals of this delay line are averaged by adder 704 and divider 706. An additional equalizing delay of one line plus 70 nanoseconds to compensate for the delay line 41 is provided by delay line 700 within filter 36. The output signal of filter 36 from divider 706 is supplied to a comparator 44 in FIG. 3. Filter 38 supplies the average of diagonal points 24 and 26 (a "second diagonal" average). It comprises an 8-bit digital delay line 802 in FIG. 8 having a delay of two horizontal lines minus 280 nanoseconds. The delayed and undelayed signals are averaged by adder 804 and divider 806, while the digital signal from input 32 is first delay equalized by a 280 nanosecond delay line 800. The output signal from divider 806 is applied to a comparator 46 in FIG. 3. Lastly, filter 40 supplies the average of points 16 and 18 (a "vertical" average). It comprises an 8-bit digital delay line 902 in FIG. 9 having a delay of two horizontal lines. The delayed and undelayed signals are averaged by adder 904 and divider 906, while the digital signal from input 32 is first delay equalized by a 140 nanosecond delay line 900. The output signal from divider 906 is applied to a comparator 48 in FIG. 3.

Figure 10:
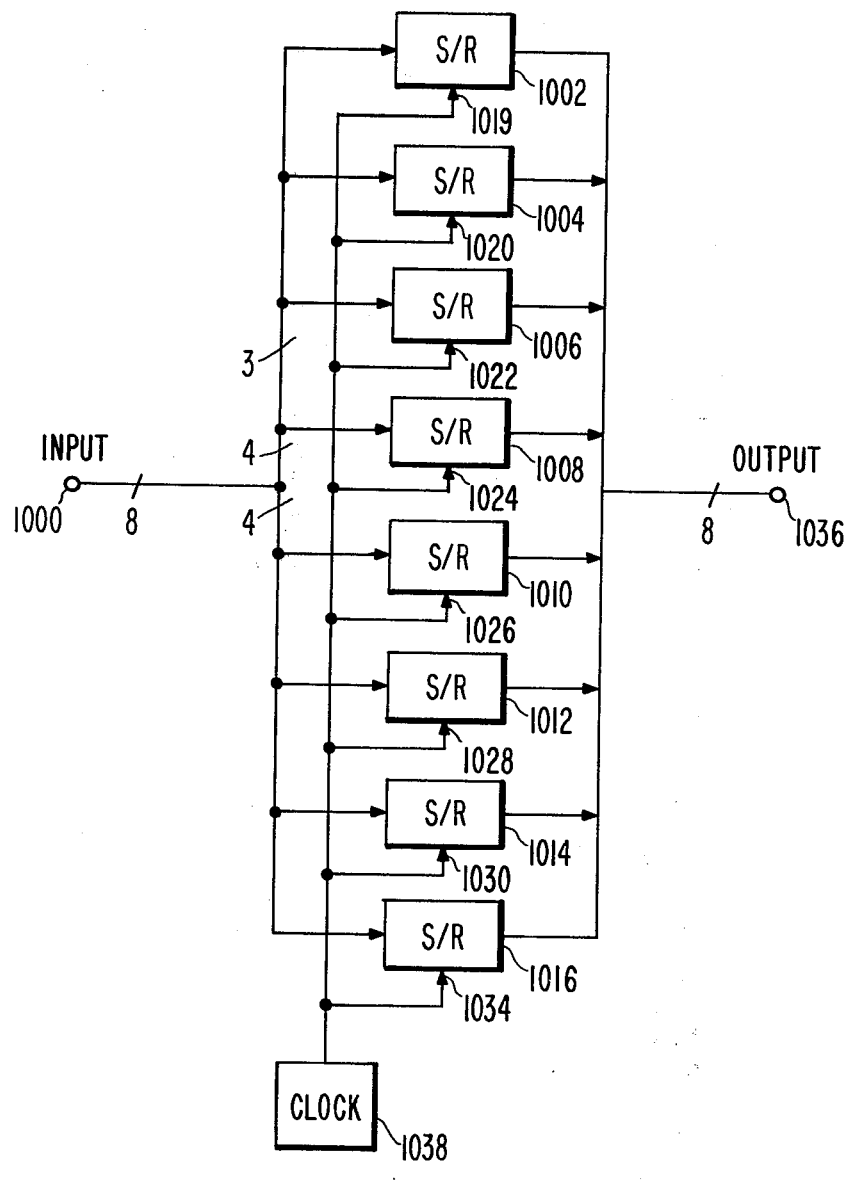
FIG. 10 shows a block diagram of a digital delay line used in FIGS. 6, 7, 8 and 9.

FIG. 10 shows an 8-bit wide delay line for use in the filters 34, 36, 38 and 40 and delay 41. It comprises eight shift registers 1002, 1004, 1006, 1008, 1010, 1012, 1014 and 1016, each of which receives one bit of the 8-bits simultaneously present at input 1000. The bits are shifted within the registers under the control of a clock signal from clock 1038 coupled to shift inputs 1018, 1020, 1022, 1024, 1026, 1028, 1030, and 1034. The number of stages of the shift registers are chosen to achieve the desired delay. The outputs of the shift registers are coupled to 8-bit parallel output 1036. Comparators 42, 44, 46 and 48 each comprise an 8-bit subtractor that also receives the original 8-bit samples through delay line 41 in addition to the outputs of filters 34, 36, 38 and 40 respectively. The respective two signals in each comparator are subtracted and then the absolute value is taken of the resulting difference. The comparators apply absolute value signals to a minimum error logic circuit 50.

Figure 5:
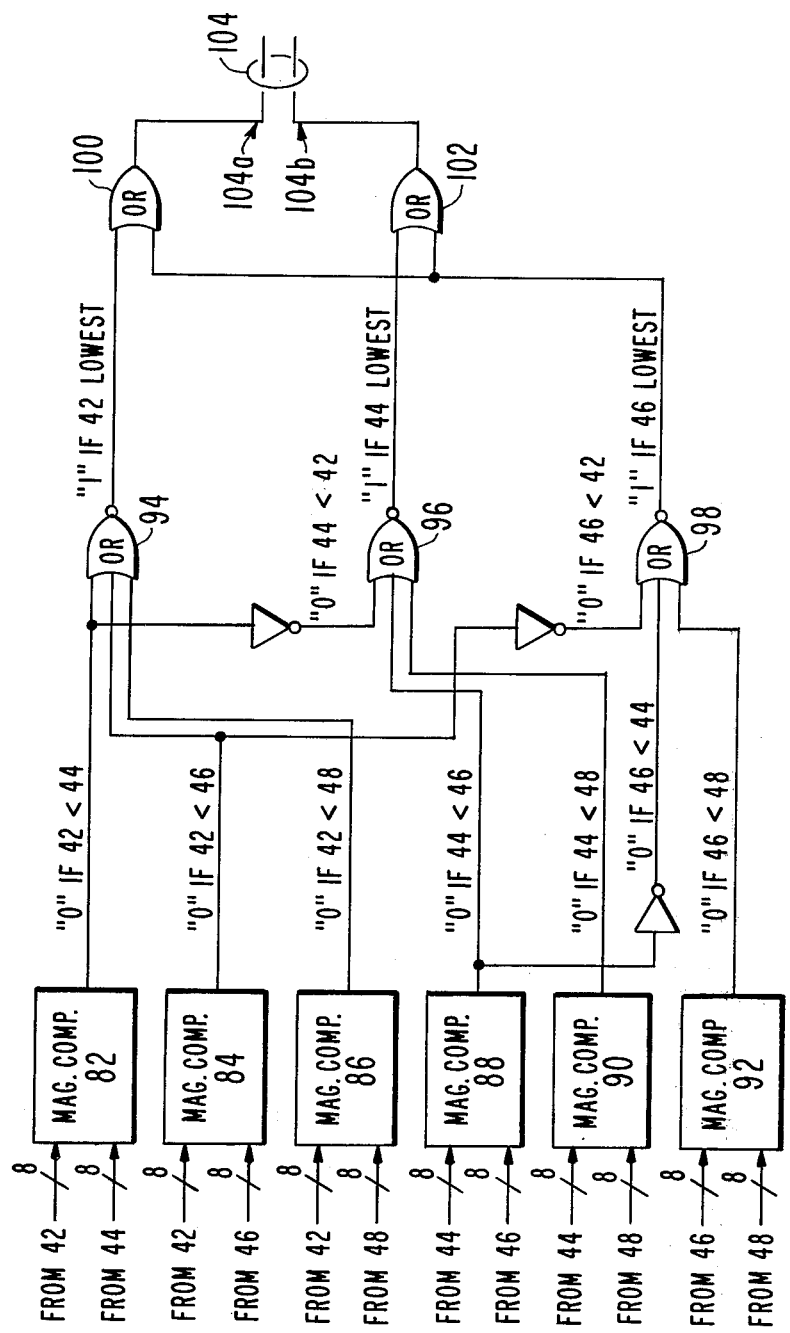
FIG. 5 shows a block diagram of a minimum-error logic circuit used in FIG. 3.

As shown in FIG. 5, minimum error logic circuit 50 comprises 6 magnitude comparators 82, 84, 86, 88, 90 and 92, each of which receives two 8-bit numbers from different pairs of the output signals of comparators 42, 44, 46 and 48 and supplies at its respective output a one-bit logic level indication to indicate which of the two respective input numbers is smaller. It should be noted that there are only six possible combinations of four numbers taken in pairs, thus giving rise to the six magnitude comparators. It is only necessary to look at three of the magnitude comparator outputs to determine if a specific magnitude comparator input is the lowest. Thus NOR gates 94, 96, and 98 are used to detect if the output signal from comparators 42, 44, and 46 respectively are the lowest. If none are the lowest, the output signal from 48 is assumed to be the lowest which will be true, or none will be lowest, i.e. they are all equal, in which later case the output signal from any comparator will do. The output signals from gates 94, 96, and 98 are coded by OR gates 100 and 102 into the 2 bit control signal on bus 104 in accordance with the following truth table:

| Line No. | Lowest Signal | | | |
|---|---|---|---|---|
| | 42 | 44 | 46 | 48 |
| 104a | 1 | 0 | 1 | 0 |
| 104b | 0 | 1 | 1 | 0 |

The output of logic circuit 50 comprises two bits in accordance with the above table which indicate which of the pairs of samples of adjacent points is the closest match, i.e. represents which direction has the least change of the video signal around the sample point 14. This two-bit signal makes up the control signal indicating which of the transmitted video sample signals most closely represents the untransmitted video signal so that complete video information can be obtained upon decoding. The two control bits are applied to a switch 52 in FIG. 3, which is a two-bit switch operated in synchronization with an 8-bit switch 54 in FIG. 3 at a 7.16MHz switching rate. This switching rate, since it is 14.32MHz divided by 2, causes switch 54 to pass or transmit only every other 8-bit sample. The 2 control bits from logic circuit 50, that indicate which of the adjacent samples are to be used in reconstructing the untransmitted points, are passed by switch 52, and together with the 8 bits simultaneously passed by switch 54 representing a transmitted point, form a 10-bit parallel word at 10-bit parallel output 55.

Figure 4:
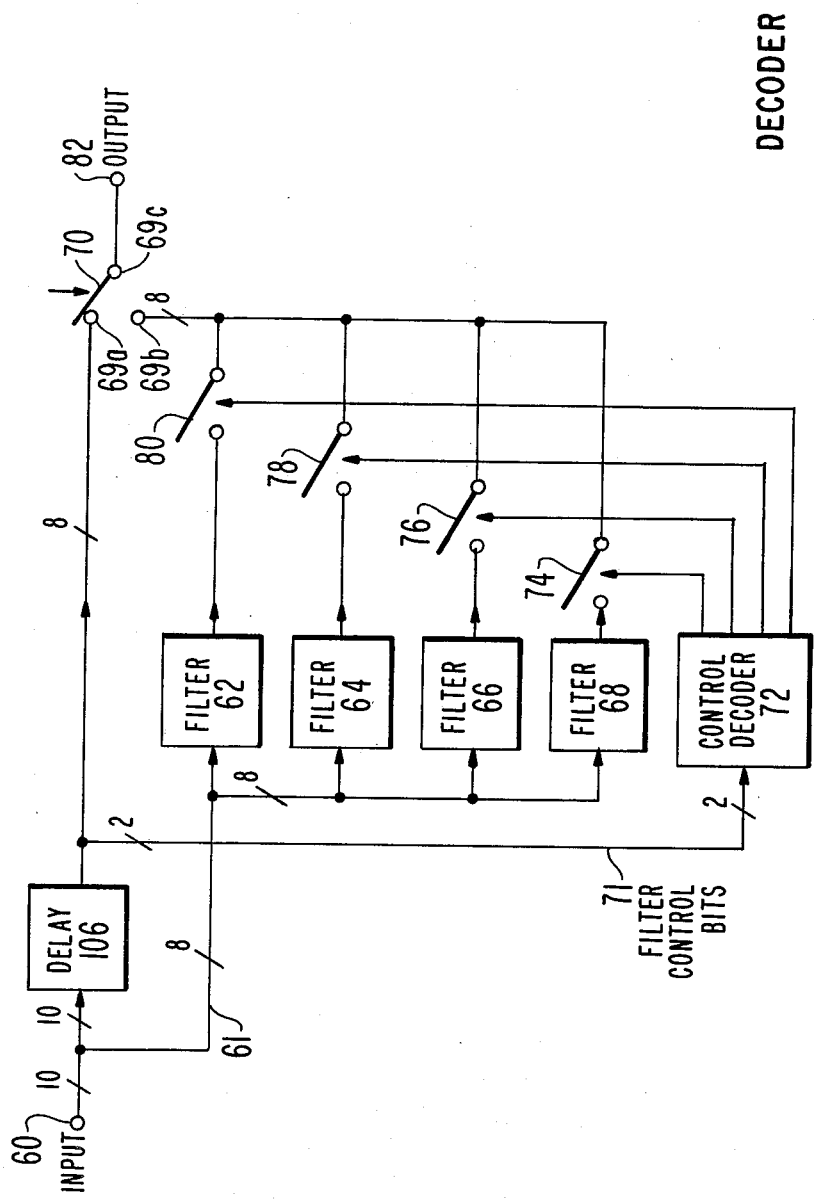
FIG. 4 illustrates a block diagram of a decoder for decoding information encoded by the apparatus of FIG. 3.

FIG. 4 shows the decoder for use in the present invention. The 10-bit parallel signal is received at input 60. The 8 bits representing a sample of a picture point are applied by 8-bit bus 61 to filters 62, 64, 66 and 68, the internal construction of which is the same as filters 34, 36, 38 and 40 respectively. The same 8 bits are also applied to contact 69a of 8-bit switch 70 through delay line 106 that has the same delay as delay line 41 and which compensates for the delay through filters 62, 64, 66, and 68. The two control bits are brought out on 2-bit bus 71 and applied to control decoder 72 for control of switches 74, 76, 78, and 80. This decoder comprises a one-of-four decoder, such as integrated circuit No. SN 74S139, manufactured by Texas Instruments, that takes the two control bits and gives a 4-bit parallel output, only one of which will be high. The 4 parallel bits are applied to the switches 74, 76, 78 and 80 respectively. Since only one of the outputs of control decoder 72 will be high, only one of the switches 74, 76, 78 and 80 will be closed at any one time at a 7.16MHz rate. This applies the signal from that one of the filters 62, 64, 66, and 68 which is the closest match for a missing sample to contact 69b of switch 70. Switch 70 is switched at a 14.32MHz rate between its two inputs 69a and 69b, and thus alternately supplies a sample point of the original picture and a reconstructed 8-bit signal to its output 69c. Since each of the signals occurs at a 7.16MHz rate, the resulting signal from output 69c of switch 70 is at 14.32MHz.

It will be appreciated that the above-described invention may also be implemented as a sampled analog system. Further, a single tapped delay line can be used instead of the separate delay lines of filters 34, 36, 38, and 40. These filters will then just comprise averagers. The same construction applies with respect to filters 62, 64, 66, and 68.

What is claimed is:
1. A method of transmitting data divided into first and second portions, each portion comprising a plurality of bytes, said method comprising transmitting said first portion, comparing at least one byte of the remaining untransmitted second portion to a plurality of selected combinations of bytes of said first portion, determining which of said selected combinations of bytes of said first portion is the closest match to said one byte of said second portion, and transmitting a control byte indicative of said closest match.

2. A method as claimed in claim 1 wherein said bytes represent samples of a video signal, said first portion represents alternately occurring samples of scanning lines, said first portion samples of adjacent lines being horizontally staggered with respect to each other, and said comparing step comprises comparing second portion samples to first portion samples that are immediately adjacent to the respective second portion sample.

3. A method as claimed in claim 2 wherein said combinations comprise the average of samples representing points immediately above and below said one byte and the average of samples representing points immediately to the left and right of said one byte.

4. A method as claimed in claim 1 wherein each of said data bytes comprises eight bits and said control byte comprises two bits.

5. A method for receiving transmitted data, said transmitted data comprising a first transmitted portion of control bytes indicative of which of selected combinations of bytes of said first portion is a closest match to respective bytes of an untransmitted second portion, said method comprising extracting said control bytes from said transmitted data, extracting said selected combinations from said transmitted data, applying to an output said bytes that are the closest match in accordance with said control bytes, and alternately applying to said output said first portion.

6. A device for transmitting data divided into first and second portions, each portion comprising a plurality of bytes, said device comprising means for transmitting said first portion, means for providing selected combinations of bytes of said first portion, means for comparing at least one byte of the second portion to said selected combinations, means for determining which of said selected combinations is the closest match to said one byte and for generating a control byte indicative of said closest match, said control byte being applied to said transmitting means.

7. A device as claimed in claim 6 wherein said bytes represent samples of a video signal, said first portion represents alternately occurring samples of scanning lines, said first portion samples of adjacent lines being horizontally staggered with respect to each other, and said comparing step comprises comparing second portion samples to first portion samples that are immediately adjacent to the respective second portion sample.

8. A device as claimed in claim 7 wherein said combinations comprise the average of samples representing points immediately above and below said one byte and the average of samples representing points immediately to the left and right of said one byte.

9. A device as claimed in claim 6 wherein said providing means comprises a filter bank.

10. A device as claimed in claim 6 wherein said comparing means comprises a plurality of comparators.

11. A device as claimed in claim 6 wherein said determining means comprises a minimum error logic circuit.

12. A device for receiving transmitted data, said transmitted data comprising a first transmitted portion and control bytes indicative of which of selected combinations of bytes of said first portion is a closest match to respective bytes of an untransmitted second portion, said device comprising means for decoding said control bytes from said transmitted data, means for extracting said selected combinations from said transmitted data, an output, means for applying to said output said bytes that are the closest match in accordance with said control bytes, and alternately applying to said output said first portion.

13. A device as claimed in claim 12 wherein said extracting means comprises a filter bank.

14. A method of transmitting signals comprising first and predetermined second time portions, said method comprising transmitting said first portion, and transmitting a distinct control signal adapted to control the reconstruction of said second portion from the transmitted first portion.

15. A method as claimed in claim 14, wherein said first and second portions comprise video signals.

16. A method as claimed in claim 14 wherein all of said signals comprise digital signals.

17. A method as claimed in claim 14 wherein said first portion comprises a plurality of samples and said control signal indicates which of said samples is the closest match to said second portion.

18. A method for receiving a signal having a transmitted first predetermined time portion, an untransmitted second predetermined time portion, and a distinct transmitted control portion, said method comprising receiving said first and control portions, and reconstructing said second portion from said first portion by using said control portion.

19. A method as claimed in claim 18 wherein said first and second portions comprise video signals.

20. A method as claimed in claim 18 wherein said signal comprises a digital signal.

21. A method as claimed in claim 18 wherein said first portion comprises a plurality of samples, and said control portion indicates which of said samples is the closest match to said second portion.

22. An apparatus for transmitting signals comprising first and second predetermined time portions, said apparatus comprising means for transmitting said first portion, and means for transmitting a distinct control signal adapted to control the reconstruction of said second portion from the transmitted first portion.

23. An apparatus as claimed in claim 22 wherein said first and second portions comprise video signals.

24. An apparatus as claimed in claim 22 wherein all of said signals comprise digital signals.

25. An apparatus as claimed in claim 22 wherein said first portion comprises a plurality of samples and said control signal indicates which of said samples is the closest match to said second portion.

26. An apparatus for receiving a signal having a transmitted first predetermined portion, an untransmitted second predetermined portion and a distinct transmitted control portion, said apparatus comprising means for receiving said first and control portions, and means for reconstructing said second portion from said first portion using said control portion.

27. An apparatus as claimed in claim 26 wherein said first and second portions comprise video signals.

28. An apparatus as claimed in claim 26 wherein said signal comprises a digital signal.

29. An apparatus as claimed in claim 26 wherein said first portion comprises a plurality of samples, and said control portion indicates which of said samples is the closest match to said second portion.

* * * * *